J. O. ROSS.
METHOD OF AND APPARATUS FOR RECOVERING HEAT FROM DRIERS.
APPLICATION FILED MAR. 7, 1918.
1,365,790.
Patented Jan. 18, 1921.
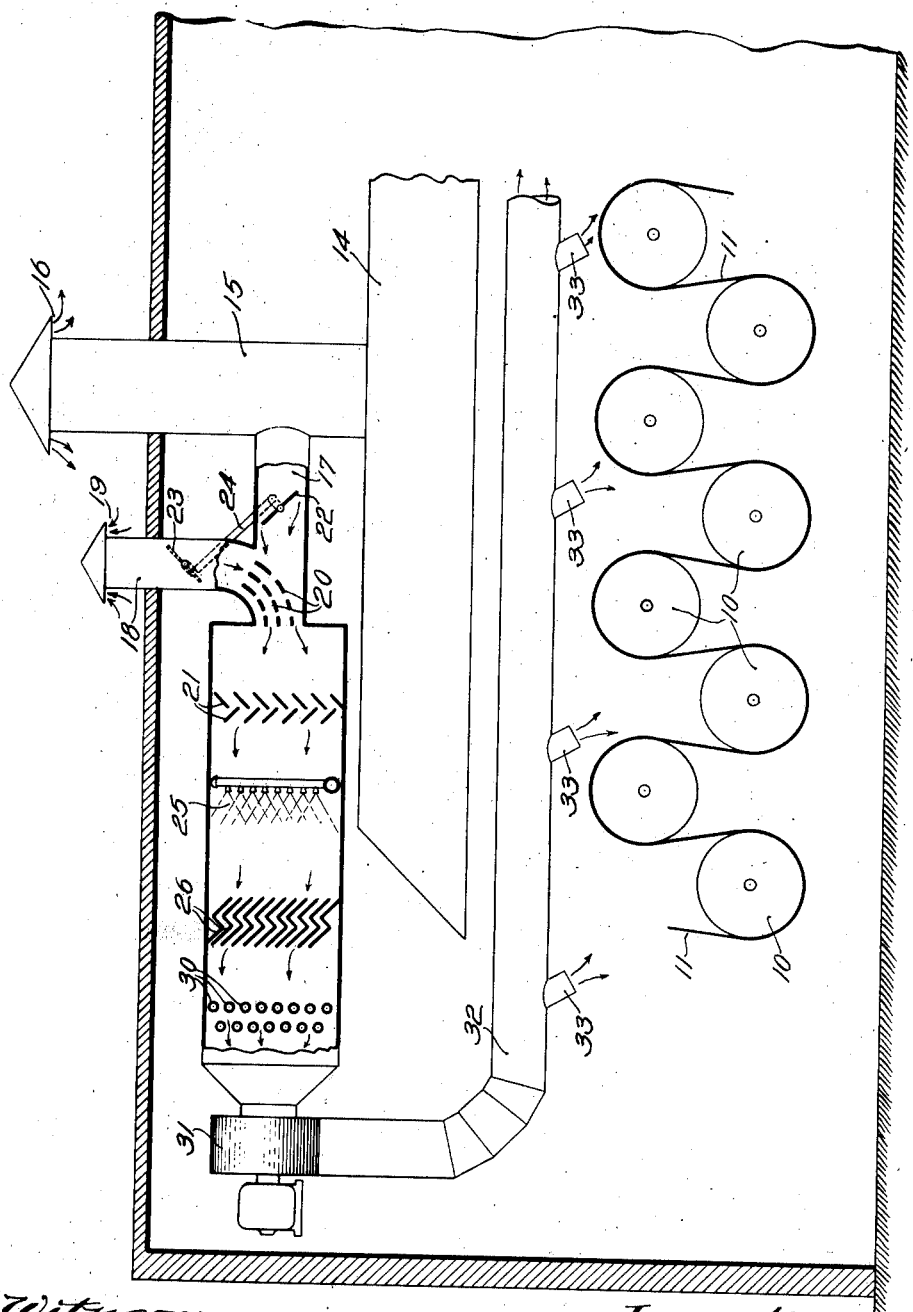

UNITED STATES PATENT OFFICE.

JOHN O. ROSS, OF BOSTON, MASSACHUSETTS, ASSIGNOR TO B. F. STURTEVANT COMPANY, OF BOSTON, MASSACHUSETTS, A CORPORATION OF MASSACHUSETTS.

METHOD OF AND APPARATUS FOR RECOVERING HEAT FROM DRIERS.

1,365,790. Specification of Letters Patent. Patented Jan. 18, 1921.

Application filed March 7, 1918. Serial No. 221,004.

*To all whom it may concern:*

Be it known that I, JOHN O. ROSS, a citizen of the United States, residing at Roslindale, Boston, in the county of Suffolk and State of Massachusetts, have invented certain new and useful Improvements in Methods and Apparatus for Recovering Heat from Driers; and I do hereby declare the following to be a full, clear, and exact description of the invention, such as will enable others skilled in the art to which it appertains to make and use the same.

The present invention relates to a method of and apparatus for recovering heat from driers and more particularly to a method of recovering the heat in air exhausted from the dry houses of paper mills or similar establishments.

It is customary in connection with the manufacture of paper to dry the wet web of paper in part at least by hot dry air which is delivered into the interior of the drying house and after absorbing moisture from the paper rises to the top of the house and is exhausted into the atmosphere. As this air is normally heated to a temperature of from 125 to 130 degrees it may readily be seen that in a drying house of the ordinary size the waste of heat with an outside temperature approximating zero degrees is enormous.

It has been attempted in certain existing installations to recover a portion of this heat by mixing a small percentage of the hot moist air from the drier with the incoming atmospheric air but this method is inefficient as even with the smallest percentages of hot moist air the resulting mixture becomes supersaturated, making it necessary to reëvaporate the condensed moisture in the heater. Furthermore it is necessary to heat this mixture to a temperature of approximately 138 degrees as against a temperature of 125 degrees for the cold dry air in order to secure an equal drying effect. As the temperature of 130 degrees in the drying house is about the maximum which the operatives may undergo without injury to health, it is obvious that the higher temperature is a distinct disadvantage.

It is the object of the present invention to provide a method for utilizing to the maximum the heat contained in the hot moist air and incidentally to afford a better and more uniform regulation of the temperature within the drying house.

One feature of the present invention, then, consists in mixing a portion of the hot moist air exhausted from the drier with atmospheric air at a lower temperature, removing the condensed moisture from the resulting cooled mixture to leave the air with only sufficient moisture to saturate it at that temperature, and finally heating the mixture to a higher temperature for drying purposes.

The accompanying drawing illustrates partially diagrammatically an apparatus for practising the improved method.

In the drying of paper as ordinarily practised air at 125 degrees is delivered into the dry house where each cubic foot of air absorbs about 25 grains of moisture when the outside temperature approximates zero degrees or lower. Air at 125 degrees containing this amount of moisture is 63 per cent. saturated, which has been found to be about the greatest degree of saturation which may be permitted without causing moisture to be deposited upon the walls and roof of the house. With cold dry air heated to 125 degrees, then, substantially all of the absorptive capacity of the air has been utilized but without recovering any of the heat from the hot moist air exhausted from the house.

The present invention contemplates utilizing as great a portion of this exhaust heat as possible without impairing the absorptive capacity of the incoming air or necessitating a temperature which is injurious to the health of the operative. To this end substantially 30 per cent. of the hot moist air at 125 degrees and containing 25 grains of moisture per cubic foot is mixed with 70 per cent. of cold dry air at zero degrees with the result that a supersaturated mixture is obtained having a temperature of about 61 degrees. This supersaturated mixture is then passed through an air washer which removes the surplus or condensed moisture without absorbing heat from the mixture and delivers saturated air at 61 degrees to the heater. Each cubic foot of this saturated air contains 6 grains of moisture and when heated to 131 degrees the absorptive capacity of each cubic foot of air is the same as that of the cold dry air heated to 125 degrees. In other words, according to this method the required absorptive capacity is obtained by raising the temperature of the air from 61 degrees to 131 degrees, or 70 degrees; whereas if cold dry air at zero degrees is used exclusively, it is necessary to raise the temperature 125 degrees to secure the same absorptive capacity with a resulting increased consumption of steam.

The principles involved in this method will be readily apparent when it is considered that each pound of air at 125 degrees and 63 per cent. saturated contains 403 grains of moisture and if it is considered that 3 pounds of this air are utilized in every 10 pounds of mixture three times 403 grains or 1209 grains of moisture would then be embodied in each 10 pounds of mixture. As each pound of air at 125 degrees with 403 grains of moisture contains 90 B. T. U.'s the 3 pounds in each 10 pounds of mixture contain a total of 270 B. T. U.'s and as the outside air is coming in at zero or lower the resulting 10 pounds of mixture also contains 270 B. T. U.'s. This is equivalent to 27 B. T. U.'s for each pound of mixture and accordingly the temperature of the mixture corresponding to this number of B. T. U.'s must approximate 61 degrees. However, saturated air at 61 degrees can carry only about 82 grains of moisture per pound so that the 10 pounds of mixture could carry only about 820 grains when fully saturated. As the mixture actually contains 1209 grains of moisture for each pound of air, however, it is evident that the excess of moisture approximating 390 grains for every 10 pounds of air must be eliminated if it is not to be reëvaporated in the heater.

In the apparatus shown in the drawing the rolls of the paper machine are indicated at 10 with a web of paper 11 passing thereover. The hot moist air as it rises from the paper machine may be collected by a hood 14 suspended over the rolls and communicating with an exhaust duct 15 which projects through the roof of the building and is provided with the usual vent openings 16. According to the present invention a portion of this hot moist air is diverted through a duct 17 connecting the exhaust duct with a cold air duct 18 which projects through the roof of the building and is provided with the usual air intake openings 19. The hot moist air and the cold air at atmospheric temperature are initially mixed by passage through a series of guide vanes 20 and then through inclined baffle plates 21. The proportion of hot moist air to the cold atmospheric air is controlled by dampers 22 and 23 located, respectively, in the ducts 17 and 18 and connected by an operating link 24 in such a manner that when one damper is opened the other is closed and vice versa to vary the proportion of hot moist air to cold dry air when desired while keeping the total volume of the mixture substantially the same. It will thus be seen that after the two bodies of air have been thoroughly mixed by the baffle plates the result will be a supersaturated mixture of air at a temperature determined by the proportions of the mixture and the temperature, respectively, of the hot moist air and cold dry air. In the ordinary practice, however, the temperature of this mixture will average about 61 degrees where 30 per cent. of hot moist air at 125 degrees is mixed with 70 per cent. of cold dry air at zero degrees. As the temperature of the outside air drops below zero degrees the proportion of hot moist air may be correspondingly increased to maintain the temperature of the mixture substantially the same. Obviously the greater the proportion of hot moist air which is mixed with the cold dry air the greater the amount of heat which is given up to the incoming mixture. Owing to the fact that the evaporation curve for air rises very slightly from zero to 60 degrees and with increasing rapidity thereafter there is no substantial economy in producing an incoming mixture much above 60 degrees as the saturated air at higher temperatures will cut down the absorptive capacity of the air when introduced into the dry house. The supersaturated air at 61 degrees after leaving the inclined baffle plates 21 passes through an air washer, indicated at 25, which may consist of a series of finely divided sprays of water which scrub the air and remove all of the condensed moisture, leaving only sufficient moisture in the air to saturate it at that temperature. This water is continuously circulated by any suitable form of pump, not shown, and as it simply removes the condensed moisture from the air without either heating or cooling, the only power required to operate the washer is that for the pump, the water in the washer assuming almost immediately after the apparatus has started the temperature of the air flowing therethrough. The air washer may, in addition to the finely divided sprays of water, comprise a series of inclined baffle plates 26 which serve to further remove any products of condensation which still remain in the air. This air washer is of a standard type, for example, that shown and described on page 60 of catalogue No. 243 of the B. F. Sturtevant Company, Boston, Massachusetts, published November 1917. After its passage through the air washer the saturated air at 61 degrees is passed through a series of heating coils, indicated at 30, which heat the air to a temperature of approximately 131 degrees, thus giving it an absorptive capacity of 25 grains of moisture per cubic foot when 63 per cent. saturated.

A suitable type of suction fan, indicated at 31, serves to draw the air through the washer and heating coils and discharge it through a delivery duct 32 and nozzles 33 in proximity to the paper machine.

The present method of absorbing moisture in dry houses has several distinct and important advantages. First, by heating the drying air only from 60 degrees to 130 degrees, the most effective portion of the evaporation curve of the air is utilized. Second, the heat contained in the hot moist air exhausted from the dry house is utilized to the greatest possible extent to raise the temperature of the incoming air. Third, this heat is utilized and the absorptive capacity of the drying air is maintained the same without raising the temperature of the air within the dry house to a point injurious to health; and fourth, a better regulation of the temperature and percentage of moisture in the drying air is secured.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A method of recovering heat from driers which consists in mixing a portion of hot moist air with atmospheric air at a substantially lower temperature, removing the condensed moisture from the resulting cooled mixture to leave the air with only sufficient moisture to saturate it at that temperature, and finally heating the mixture to a higher temperature for drying purposes.

2. A method of recovering heat from driers which consists in mixing a portion of hot moist air with atmospheric air at a substantially lower temperature, removing the condensed moisture from the resulting cooled mixture without changing the temperature to leave the air with only sufficient moisture to saturate it at that temperature, and finally heating the mixture to a higher temperature for drying purposes.

3. A method of recovering heat from driers which consists in mixing less than 50 per cent. of hot moist air with more than 50 per cent. of atmospheric air at a substantially lower temperature, removing the condensed moisture from the resulting cooled mixture to leave the mixture with only sufficient moisture to saturate it at that temperature, and finally heating the mixture to a substantially higher temperature for drying purposes.

4. A method of recovering heat from driers which consists in mixing a portion of hot moist air at approximately 125 degrees with atmospheric air at approximately zero degrees in the proportion substantially of 30 to 70, removing the condensed moisture from the resulting mixture of approximately 61 degrees to leave the air saturated at that temperature, and finally heating the mixture to a temperature of approximately 130 degrees for drying purposes.

5. A drying apparatus comprising means for mixing hot moist air exhausted from a dry house with cold dry air from the atmosphere, means for removing substantially all of the condensed moisture from the mixture of hot and cold air, means for thereafter heating the saturated air to a substantially higher temperature, and means for delivering this heated air into a dry house.

6. A drying apparatus comprising a duct for exhausting hot moist air from a dry house, a duct for delivering cold dry air to a dry house, a communicating duct to cause a portion of the hot moist air to be mixed with the cold dry air, means for controlling the proportions of hot moist air and cold dry air thus mixed, means for removing the condensed moisture from the mixture, and means for thereafter heating the saturated air to a substantially higher temperature.

7. A drying apparatus comprising an exhaust duct for hot moist air, an intake duct for cold dry air, a communicating duct between the exhaust and intake ducts, means for controlling the proportions of hot moist air and cold dry air mixed together, an air washer adapted to remove all of the condensed moisture from the mixture of cold dry air and hot moist air, means for heating the saturated mixture to a higher temperature after it is passed through the air washer, and means for drawing the air through the washer and heater and delivering it to the dry house.

JOHN O. ROSS.